Fig.1.

Sept. 14, 1965  G. M. LILLY  3,206,664
PLURAL MOTOR CONTROL WITH DIVERSE SPEEDS FOR DIFFERENT MOTORS
Original Filed March 5, 1958  3 Sheets-Sheet 2

United States Patent Office 3,206,664
Patented Sept. 14, 1965

3,206,664
PLURAL MOTOR CONTROL WITH DIVERSE SPEEDS FOR DIFFERENT MOTORS
Garland M. Lilly, Idaho Falls, Idaho, assignor to Westinghouse Electric Corporation, Pittsburgh, Pa., a corporation of Pennsylvania
Continuation of application Ser. No. 719,426, Mar. 5, 1958. This application Mar. 1, 1963, Ser. No. 262,790
19 Claims. (Cl. 318—67)

This application is a continuation of my pending application Serial No. 719,426, filed March 5, 1958, and entitled, "Control Means."

My invention relates to a means for automatically operating one or more control elements, and more particularly, to the operation of such control elements at different rates, and operation at least at one rate taking place in a predetermined discontinuous fashion.

My control means is particularly adapted to electrically actuate control elements in a linear direction to any desired predetermined or preselected positions between certain extreme positions, at a plurality of different rates, whereby the movement of said elements from one extreme position to another would control some process, such as the process taking place in various systems, from a full "on" state to a state of complete shutdown. Previous control means have been able to electrically move the control members at various predetermined rates for normal control, but in case of an emergency, they have had to rely upon movement of the control members in a direction to shut down the process by gravity, or by use of some quick-acting mechanical force, such as that exerted by a compressed spring, or by use of some combination of both. This type of emergency control is uncontrollable as it must necessarily completely shut down the process, and thereby maximize the time necessary to recover to normal operation. Another objectionable feature of previous systems lies in the type of power supply used to furnish power and control. These systems have used hybrid motor-generator sets each consisting of two direct current generators which were connected electrically in open delta and connected together mechanically to an alternating current drive motor, and excited by a field commutator such that the excited fields of the D.C. generators would produce voltages 120° out of phase. To actuate the control members the field commutator is rotated, and it includes two sets of collector arms displaced mechanically at a phase difference of 120°, which are so connected to the fields of each direct current generator to produce voltages 120° out of phase. The produced voltages are then fed into three-phase motors which operate the control members in a linear direction by the employment of some translation means, such as a rack and pinion engagement of the control members to the rotor of the three-phase motors, whereby the speed of rotation of these rotors is dependent upon the frequency and phase rotation of the voltages supplied to them from the direct current generators. These systems have inherent disadvantages in that there is a limitation on the maximum frequency obtainable because of the inductance in the fields of generators, necessitating high field voltages which result in commutator problems; furthermore, a slower voltage response would be available, for it would be necessary to wait for a specific time in order to build up sufficient fields to obtain the necessary voltages at the higher frequencies required.

I have avoided the objectionable features of previous control means by adding an emergency means for supplying high frequency electrical power, which is used in the case of emergency shutdown, and which serves to insert the control members at a faster rate, for a predetermined distance which is between normal operating conditions and complete shutdown. The insertion distance is calculated beforehand to be of such magnitude as to cope with and control the process in all but the most acute emergencies. The emergency power supply means is constructed so as to prevent the control members from moving in a direction other than towards shutdown of the process. Also, the field commutator is eliminated in my scheme by the substitution of segmented commutator which is rotatable by a high speed emergency insertion motor so that much higher frequencies are obtainable. The segmented commutator does not form a part of this invention but instead is more particularly described and claimed in the copending application, Serial No. 719,410, of Charles V. Fields and O. P. Steele III on Electrical Conversion Device, filed concurrently with the patent application hereof and assigned to the same assignee as this invention, now Patent 3,040,236. By elimination of the field commutator, the time delay for voltage and frequency changes is also eliminated. Another advantage of my invention is that when operating a plurality of linearly movable control members, a single commutator can control all of the control members, or only a portion of the control elements. My invention also contemplates the provision of one or more commutators, with each commutator being capable of operating all of said control members, or each being capable of operating only a portion of the control members, as well as being capable of existing in standby condition for the other control members, thereby providing a safer operation of the control members. In addition, my control means provides for holding the control members fixed at any desired position for normal operation.

The principal object of my invention, therefore, is to provide a novel means for automatically operating one or more control members at different rates, at least one of which operates in a predetermined discontinuous fashion in order to provide for emergency control of a process, which will not necessarily amount to complete shutdown of the process.

Another object of this invention is to provide a novel means for automatically operating one or more control members at different rates at least one of which is at a high rate for emergency control purposes, and which includes a means to reset the emergency control means at any point in its travel after emergency control of the process has been initiated.

Another object of my invention is to provide a novel means for automatically operating one or more control members at different rates at least one of which operates in a predetermined discontinuous fashion in order to provide for emergency control of a process, and having a means for providing standby power to the control members in the case of loss of power to a portion of the control means.

Another object of my invention is to provide a novel means for automatically operating one or more control members at different rates at least one of which operates in a predetermined discontinuous fashion in order to provide for emergency control of a process, and also having means for operating the emergency control means only in a direction which shuts down the process.

Another object of my invention is to provide a novel means for automatically operating one or more control members at different rates, at least one of which operates in a predetermined discontinuous fashion in order to provide for emergency control of the process, and having means for revoking the emergency control means at any point during its operation.

These and other objects of my invention will become more apparent upon the reading of the following description of one embodiment thereof, with reference to the attached drawings, in which.

Figure 1:
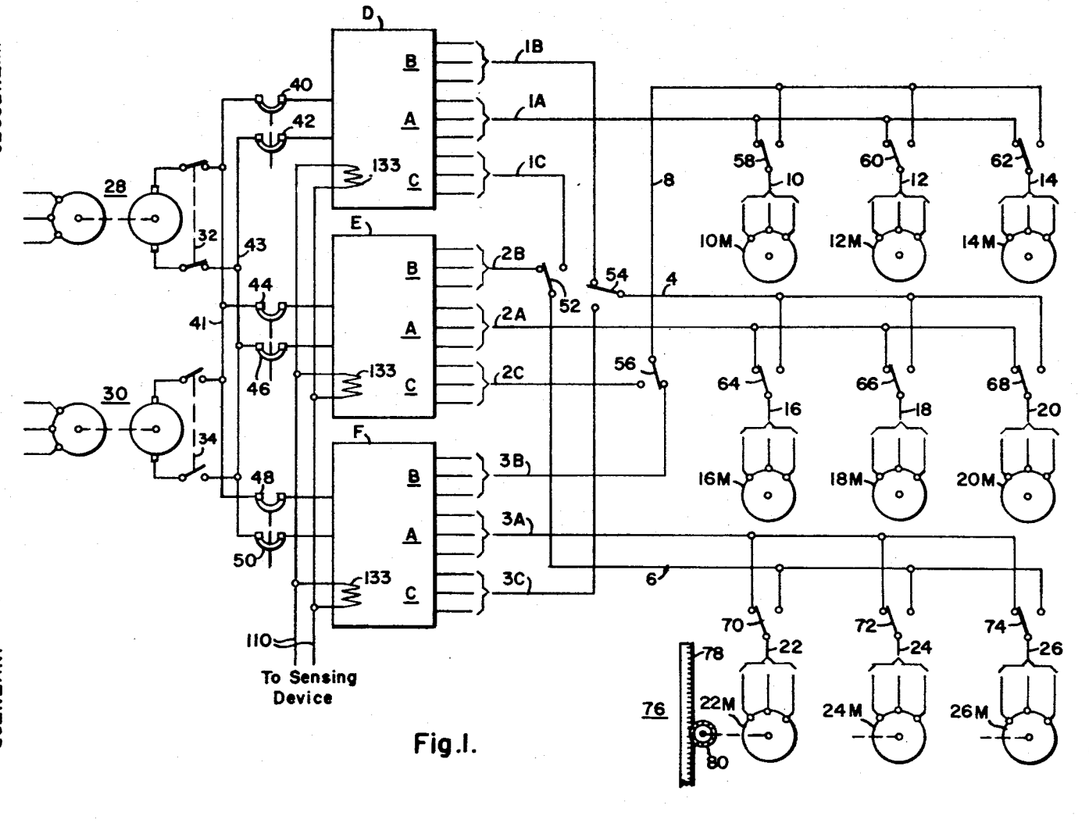
FIGURE 1 is a single line schematic view of a control means designed in accordance with this invention.
Figure 2:
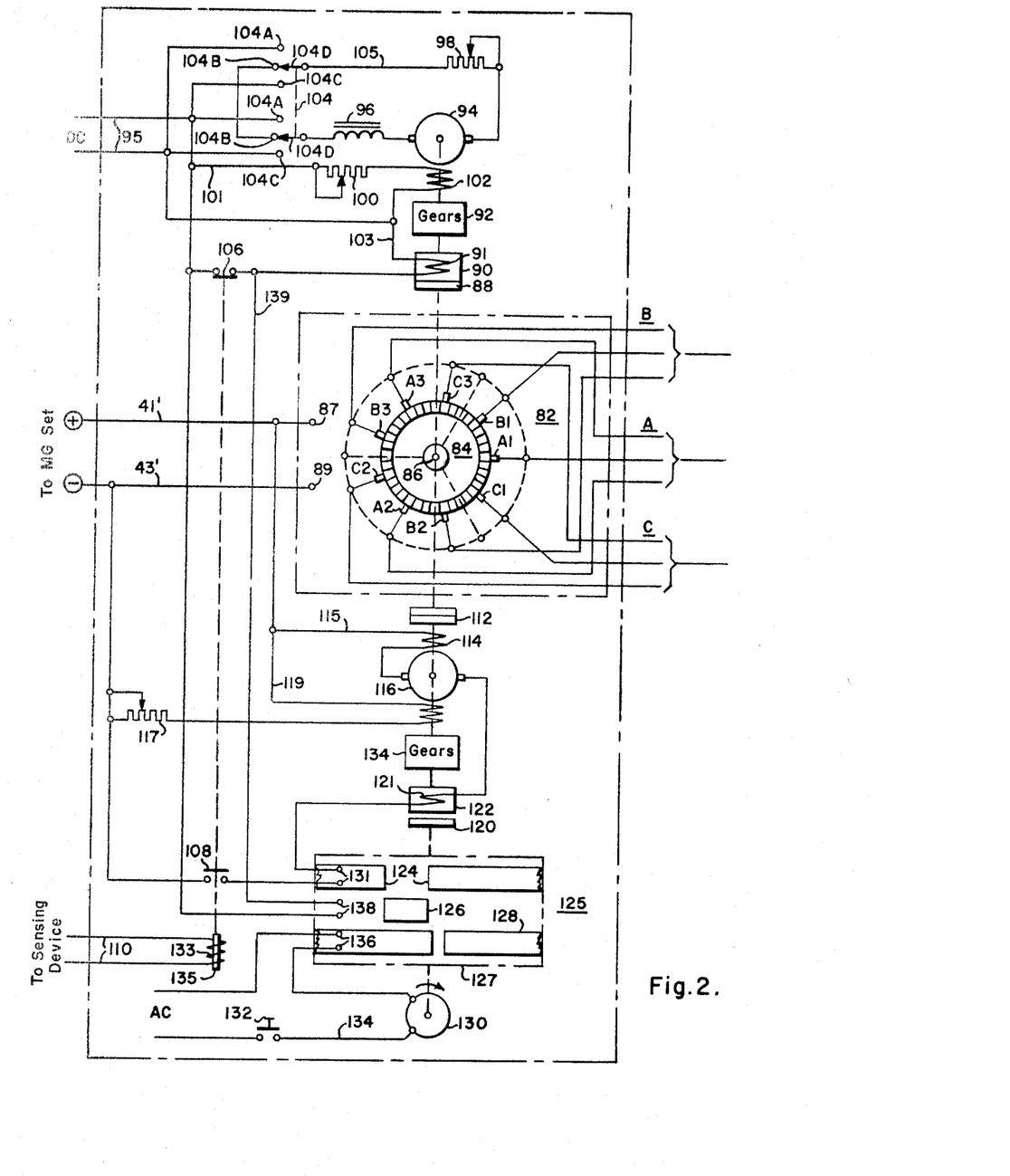
FIG. 2 is a schematic view of a commutator and commutator operating means used in the control scheme illustrated in FIG. 1.
Figure 3:
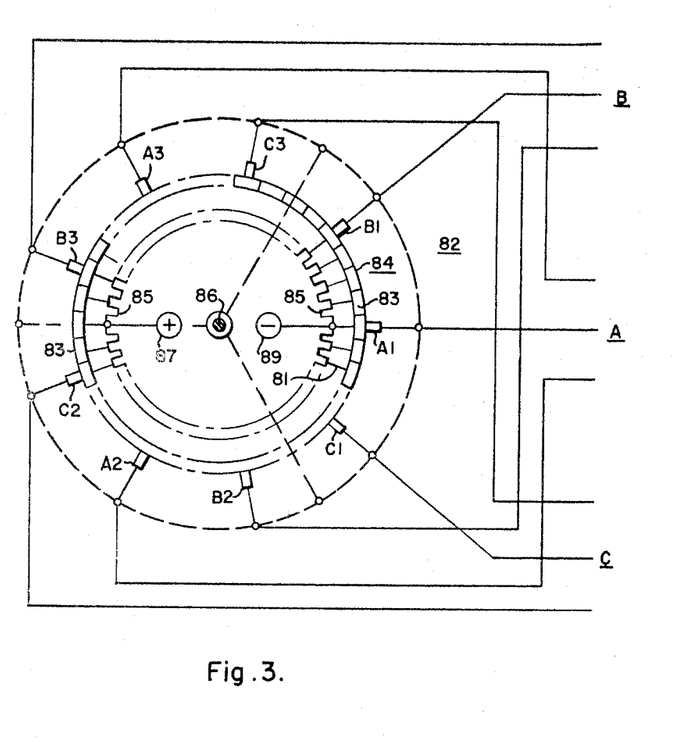
FIG. 3 is an enlarged view of the commutator shown in FIG. 2 showing the resistor network associated with the commutator.

In the illustrative form of my invention shown in FIGS. 1 through 3, control of the process is achieved by inserting control members, such as members 76 into a chamber, not shown, in which the process being controlled is confined. It is to be noted that control of other processes may be achieved by removing control members from the chamber confining them and that is easily achieved by simply reversing the power leads to each of the control motors, such as 10M. Generally, the control means is provided with two motor generator sets 28 and 30, which are adapted to be connected in parallel to the resistor networks 85 (FIG. 3) of three commutators D, E and F, respectively. Under conditions where one motor generator set is connected and the other motor generator set may be disconnected and remain in standby position capable of being connected to the resistor network 85 by properly operating the switches 32 and 34. The two motor-generator sets may be paralleled by closing both the switches 32 and 34 if requirements necessitate a continuous maintenance of electrical power. Each of the motor generator sets 28 and 30 supply direct current power to the main buses 41 and 43, through switches 32 and 34, respectively. The main buses 41 and 43 energize leads 87 and 89 of the resistor networks 85, of each of the commutators D, E and F through circuit breakers 40–42, 44–46, and 48–50 respectively.

Each of the commutators is provided with a circularly shaped, segmented face plate 84 which is comprised of a plurality of individual segments 83, constructed of a metal having good electrical conductance, such for example as copper or a copper alloy. The segments 83 are insulated from each other by means of a thin layer of an insulating material interposed therebetween, such for example, as a phenolic insulating material. A resistor network 85 is provided for each commutator and has a plurality of taps 81 which are individually connected to single segments 85 of the face plate 84, respectively. The resistor network 85 may comprise a rheostat having a number of fixed taps 81, unequally spaced thereon so that the resistive change between adjacent taps 81 is unequal. Inasmuch as adjacent taps 81 are connected to adjacent segments 83 of the face plate 84, respectively, the spacing of the resistors' taps is preferentially made to give a sinusoidal output to a brush, such as A1, when the latter is rotated about and in engagement with the face plate 84. Each commutator is provided with nine brushes C1, A1, B1, C3, A3, B3, C2, A2, and B2 which are each mechanically connected to a drive shaft 86 located centrally of each of the commutators D, E and F. Each of the brushes is displaced 40° from its two adjacent brushes, and is capable of being rotated around the outer circumference of the segmented face plate 84 and in contact therewith.

The shaft 86 of each of the commutators is provided with nine collector rings, not shown, to which commutator brushes A1, A2, B1, B2, B3, C1, C2, C3 are connected respectively. Each set of three brushes located 120° out of phase with each other, such as A1, A2, A3; B1, B2, B3; C1, C2, C3 are grouped from their respective collector rings to form three outputs B, A, C, each having three phase voltages. The frequency of these voltages is proportional to the speed of rotation of the brushes and the phase sequence is determined by the direction of rotation of the brushes. It is apparent that the three commutators D, E and F supply, in total, nine outputs 1B, 1A, 1C, 2B, 2A, 2C, 3B, 3A, 3C of three phase voltage.

Referring specifically to FIGURE 1, it is to be noted that the present embodiment of my invention provides for control of nine control motors 10M, 12M, 14M, 16M, 18M, 20M, 22M, 24M, 26M, which are grouped in three sets of three motors per set, such as 10M, 12M, 14M; 16M, 18M, 20M; 22M, 24M, 26M and whose inputs may be connected to certain commutator outputs through selective switching. Each of the control motors, such as motor 22M, are frequency responsive motors, for example, three-phase reluctance motors, and each is provided with a control member, such as member 76, having an integral rack portion 78, so that the member 76 is movable in a linear direction by the use of some translating means, such as a pinion gear 80 attached to the rotor shaft of the control motor and engaging the rack portion 78 of the control member 76. Upon rotation of the rotor, the rotative motion of the pinion gear 80 is translated to linear motion of the control member 76. Although this means for translating rotary motion to linear motion is simplified here for purposes of illustration only, it is apparent that various types of motion translating means can be used. Another three-phase control motor and translating means which can be used in this control scheme is that described and claimed in Patent No. 2,780,740, issued February 5, 1957 to W. R. Roman and R. C. Robinson on a Linear Motion Device, and assigned to the same assignee as this invention.

FIG. 1 illustrates the circuit connection for normal operating conditions. It will be noted that commutator D is provided with output circuits 1B, 1A and 1C which are shown as being capable of operating all of the control motors. However, circuit 1B is connected to one stationary contact of switch 54 which is normally engaged by the movable contact of this switch connecting circuit 1B to circuit 4, and circuit 4 extends to one stationary contact of switches 64, 66 and 68 respectively, which are normally not engaged by the movable contacts of these switches. Circuit 1A provides normal operation of the set of control motors 10M, 12M, and 14M for circuit 1A is connected to circuits 10, 12 and 14 through the normally closed contacts of switches 58, 60 and 62, respectively. Circuit 1C normally merely extends to the stationary contact of switch 52 normally not engaged by movable contact thereof.

Commutator E is similarly provided with three output circuits 2B, 2A and 2C. Circuit 2B is connected to the normally closed stationary contact of switch 52 which connects circuit 2B to circuit 6. Circuit 6 further leads to the normally open stationary contacts of switches 70, 72 and 74 respectively. Circuit 2A normally operates the set of control motors 16M, 18M and 20M by connection to circuits 16, 18 and 20 through the normally closed stationary contacts of switches 64, 66 and 68, respectively, and circuit 2C merely extends to the normally open stationary contact of switch 56.

Commutator F is also provided with three three-phase outputs denoted as circuits 3B, 3A and 3C. Under normal operating conditions, circuit 3B is connected to the normally closed stationary contact of switch 56 and thus to circuit 8 which extends to the normally open stationary contact switches 58, 60 and 62, respectively. Circuit 3A provides for normal operation of the set of control motors 22M, 24M and 26M by extending directly to the normally closed stationary contacts of switches 70, 72 and 74 thereby being in communication with circuits 22, 24 and 26, respectively. Circuit 3C is connected directly to the normally open stationary contact of switch 54.

It should be noted that the switches shown in FIG. 1, shown for purposes of illustration as single pole switches are actually three-pole, double throw switches, having stationary and movable contacts and are well-known in the art, and whose construction does not form a part of this invention. These switches can be manually or automatically operated or can include means for operation in both manners. If desired, the switches can also be sequentially operated by either manual or automatic means.

It should also be noted that, although the output circuits from the commutators are shown by a single line, FIG. 1, this is also done for purposes of simplifying the illustration of the invention, and these circuits are actually three wire, three-phase circuits. The latter is true for all circuits illustrated on the right-hand side of the commutators D, E and F of FIG. 1.

From the circuitry, as illustrated in FIG. 1, it is to be noted that the set of control motors comprising motors 10M, 12M, 14M are normally operated by circuit 1A. It should be noted these motors are also operable by circuit 2C or circuit 3B, for circuit 2C or 3B is connectable to circuit 8 by proper operation of switch 56, and circuit 8 may be connected to control motors 10M, 12M and 14M by connecting circuits 10, 12 and 14 to circuit 8 through switches 58, 60 and 62, respectively.

The set of control motors comprising motors 16M, 18M, 20M are normally operated by circuit 2A, however, standby operation of this set of motors may be effected by either circuit 1B or 3C. Circuits 1B or 3C may be connected to circuit 4 through switch 54 and circuit 4 may be connected to circuits 16, 18 and 20 of control motors 16M, 18M and 20M through switches 64, 66 and 68, respectively.

Similarly, the set of control motors comprising motors 22M, 24M and 26M are normally operated by circuit 3A in the manner previously described. Standby operation of the latter control motors is furnished by both circuit 1C and circuit 2B which are both connectable to circuit 6 through switch 52. Motors 22M, 24M and 26M can be connected to circuit 6 by the connection of circuit 6 to circuits 22, 24 and 26 through switches 70, 72, and 74, respectively.

Similarly, it is notable that each set of control motors is provided with a normal operating circuit and two standby circuits which allows each set of control motors to be one operable by circuit of each of the commutators D, E, and F. By appropriate switching, each of the commutators D, E, and F is capable of driving any or all of the nine control motors and accordingly, in the case where either one or two of the commutators D, E and F is disabled, operation of the control members 76 can take place by the remaining operating commutator.

To illustrate the standby capabilities of this control system, the operation of any combination of the nine control motors by the three three-phase outputs 1A, 1B and 1C of commutator D will be described. Power is removed from commutator E by opening breakers 44 and 46 and power is removed from commutator F by opening breakers 48 and 50. It has already been shown that circuit 1A operates control motors 10M, 12M and 14M. Circuit 1B is connected to circuit 4 through switch 54. By connecting circuits 16, 18 and 20 to circuit 4 through switches 64, 66 and 68, control motors 16M, 18M and 20M are now operable by circuit 1B. Circuit 1C is capable of operating control motors 22M, 24M and 26M by the connection of circuit 1C to circuit 6 through switch 52 and by the connection of circuits 22, 24 and 26 to circuit 6 by switches 70, 72 and 74, respectively.

Similarly, commutators E and F through appropriate switching are each capable of operating the complete group of control motors.

It is also possible for any one of the commutators to operate any individual control motor through appropriate switching, provided that the other two control motors connected in parallel with the individual control motor for normal operation are operated by one of the other commutators. Thus, for example, it is possible for commutator D to operate control motor 26M while commutator F operates the other eight motors. The operation of motor 26M is accomplished by connecting circuit 1C of commutator D to circuit 6 through switch 52 and by also connecting circuit 26 to circuit 6 through switch 74. The operation of the other eight control motors is accomplished as circuit 3A of commutator F normally is connected to circuits 22 and 24 of motors 22M and 24M through switches 70 and 72, respectively. Circuit 3C of commutator F is connected to circuit 4 through switch 54 and circuit 4 is connected to circuits 16, 18 and 20 of control motors 16M, 18M and 20M through switches 64, 66 and 68, respectively. Circuit 3B is normally connected to circuit 8 through switch 56 and circuit 8 is connected to circuits 10, 12 and 14 of control motors 10M, 12M and 14M through switches 58, 60 and 62, respectively. It can, therefore, be seen that any number of control motors can receive power from each of the three commutators, so that unless all three commutators are completely disabled, the operation of the control members 76 will take place.

The control motors are operated in either the clockwise or counterclockwise direction by rotation of the commutator brushes in a corresponding direction, so that the control members 76 move either into or out of the chamber enclosing the process being controlled. Since the control motors are generally reluctance type motors, the speed of rotation of the motor is proportional to the frequency of the power delivered to the motor by the driving commutator and the direction of rotation of the control motor is dependent upon the phase relationship of the input voltages thereto. Inasmuch as the frequency of the power delivered by a commutator is dependent upon the speed of rotation of its brushes, the speed of insertion or removal of the control members 76 is directly proportional to the speed of rotation of the shaft 86 of the corresponding commutator. It is also apparent that when shaft of the commutator is not moving, a D.C. voltage is applied to the stator of the control motors, so that the rotors thereof, and accordingly their control members 76 are held fixed in position.

It is apparent that many variations can be made of the number of motors to be controlled, the means for switching to standby power, and the number of commutators used; however, the foregoing illustration merely serves to illustrate an embodiment of one possible control means and is not intended to be construed in a limiting sense.

For normal operation of this control scheme, each of the shafts 86 of the three commutators is rotated by its corresponding direct current programming motor 94. Direct current power is delivered from an outside bus 95 to pairs of contacts 104A and 104C of a double pole three position reversing switch 104. The reversing switch is provided with a pair of movable contacts 104D and three stationary contacts 104A, 104B, 104C for each of the movable contacts 104D. Reversing switch 104 connects the programming motor armature circuit 105 to the direct current bus 95 with one polarity when movable contacts 104D are rotated into engagement with stationary contacts 104A. Reverse polarity of circuit 105 is achieved by rotating movable contacts 104D into engagement with contacts 104C, and circuit 105 is short circuited when contacts 104D are in engagement with contacts 104B. Circuit 105 is connected to the two movable contacts 104D of reversing switch 104 and energizes the armature of the direct current programming motor 94. In series therewith is a current limiting choke 96 and a speed control variable resistor 98. Circuit 101 is independently connected to the direct current bus 95. Circuit 101 comprises the shunt field coil 102 of the programming motor 94 in series with a variable shunt field resistor 100. Circuit 103 is also energized from the direct current bus 95 and is in parallel with the circuits 101 and 105. Circuit 103 is continuously energized by the bus 95 and comprises a coil 91 for operating the clutch 90, and a normally closed switch 106 in series with the coil 91. The rotor of the programming motor operates the shaft 86 of the commutator through a gear reduction box 92 and the clutch 90. Circuit 105 of the programming motor 94 is energized with one polarity when switch 104 is moved to a position so that contacts 104A and 104D are engaged. The current limiting choke 96 in circuit 105 will limit current to the programming motor 94, and the programming motor shunt field coil 102 is energized independent of the switch 104. The magnitude of the motor shunt field is variable by varying the shunt field resistor 100, and the speed of rotation of the programming motor 94 is regulated by varying speed control resistor 98. The connection of the rotor of the programming motor 94 to the gear reduction box 92 causes the speed of the rotation of the shaft 86 of the commutator 82 by the programming motor 94 to be substantially less than the speed of rotation of the rotor of the programming motor 94. The magnetic clutch 90, connecting the rotor of the programming motor 94 and the shaft 86 of the commutator 82, comprises a coil 91 and a movable clutch face plate 88. The construction of the magnetic clutch 90 may be any desired construction as is known in the art, and does not per se form a part of this invention. The clutch 90 is constructed to be normally uncoupled so that only when the clutch coil 91 is energized, the face plate 88 of the clutch 90 is moved to engage the clutch and the shaft 86 of the commutator 82 is coupled for rotation by the rotor programming motor 94. It can therefore be seen that the clutch 90 will be uncoupled when the switch 106 in the clutch circuit 103 is open. The rotation of the shaft 86 by the rotor of the programming motor 94 takes place at a very slow speed because the gear reduction box 92 preferably has a speed ratio of a very high order. Rotation of the programming motor 94 in the opposite direction is achieved when switch 104 is rotated until contacts 104D and 104C are engaged. It can also be seen that the programming motor 94 will not rotate the shaft 86 of the commutator 82 when the switch 106 is opened, causing the clutch coil 91 to be deenergized. Normal operation of the commutator 82 by means of rotation of its shaft 86 by the rotor of the programming motor 94 will cause the brushes A1, A2, A3, B1, B2, B3, C1, C2, C3, mechanically connected to the rotor 86, to rotate around the circumference of the segmented face plate 84 at a relatively slow speed, causing the three alternating current sinusoidal three-phase outputs B, A and C from the commutator to have relatively low frequencies.

The foregoing description has enumerated the circuitry and method for operating the commutator during normal or "steady state" conditions. The following will broadly define the structure utilized to achieve operation of the commutator during emergency conditions.

Emergency control circuit 115 is energized directly by the direct current buses 41 and 43 and it energizes the armature windings of the direct current emergency insertion motor 116. Circuit 115 also includes the emergency motor series field winding 114, coil 121 of magnetic clutch 122, contacts 131 of conductor 124 of the partial insertion limit switch assembly 125 and normally open switch 108, all of which are in series with the armature winding of the emergency insertion motor 116. Circuit 119 in parallel with circuit 115, across the buses 41' and 43', comprises the emergency motor shunt field coil 118 in series with the variable shunt field resistor 117.

The partial insertion limit switch assembly 125 to be described in detail later in the description, is operable by a unidirectional alternating current motor 130. The alternating current motor 130 is energized by circuit 134 which in turn is energizable by an external alternating current bus, not shown. The circuit 134 comprises in series a manually operable normally open switch 132, the alternating current motor 130 and the contacts 136 of the conductor 128 of the limit switch assembly 125.

The rotor of the emergency insertion motor 116 is also connected to the shaft 86 of the commutator 82 through a one-way clutch 112, to be described later. The drum 127 of the limit switch assembly 125 is coupled to the rotor of the emergency insertion motor 116 through a magnetic clutch 122.

The normally closed switch 106 of circuit 103 is mechanically connected to the normally open switch 108 of circuit 115 and both switches are operable by a movable core 135 which is actuated by coil 133 in circuit 110 of an external sensing device, not shown, to the position shown in FIG. 2, and is biased by a spring (not shown) to an upper position where switch 108 is closed and switch 106 is open when circuit 110 is deenergized.

Circuits 110 of each of the commutators D, E and F are paralleled, FIG. 1, so that circuits 110 are deenergized, the switches 108 of each of the commutators D, E and F, respectively, are simultaneously closed causing all of the emergency insertion motors 116 to operate in a manner to be described later. Circuit 139 comprising contacts 138 of conductor 126 of the limit switch assembly 125 is connected in parallel across switch 106.

In the case of an emergency when it is necessary to move the control members 76 at a very rapid rate, the switch 108 is closed by deenergizing circuit 110 either manually or by an automatic external sensing means. Since the switch 108 is mechanically connected to switch 106 in the clutch circuit of the programming motor 94, the closing of the switch 108 will automatically open the switch 106.

The programming motor 94 may still operate, however, no motion is transferred to the commutator 82. The shaft 86 of the commutator 82 will now be rotated by the rotor of the direct current emergency insertion motor 116 mechanically connected to the shaft 86 through the one-way clutch 112. The one-way clutch 112 is a device well known in the art whose function is to transfer rotation of a rotating member mechanically connected thereto in one direction only and is incapable of rotating the member in the opposite direction. It can therefore be seen that the direct current emergency insertion motor 116 will rotate the shaft 86 of the commutator 82 only in a direction to transmit three-phase alternating current voltages to each of the three-phase outputs B, A and C of the commutator in a phase relationship such that the nine control motors will be rotated only in a direction to move the control members 76 in the direction of shutdown of the process being controlled.

The circuit 115 of the direct current emergency insertion motor 116 includes a magnetic clutch 122 comprising a clutch operating coil 121 and a movable clutch face plate 120 which is biased to an uncoupled position and is moved to couple the partial insertion limit switch assembly 125 to the rotor of the motor 116 when the coil 121 is energized. The clutch 122 is coupled to the rotor of the insertion motor 116 through a gear reduction box 134 causing the speed of rotation of both the clutch 122 and the drum 127 of the limit switch assembly 125 to be of somewhat less than that of the rotor of the emergency insertion motor 116.

Generally, the partial insertion limit switch assembly 125 is a means for automatically energizing the direct current emergency insertion motor 116 for a specific time interval and then deenergizing the motor 116 at the end of the interval. Although not necessarily confined to the means employed in this control scheme, the partial insertion limit switch assembly herein described comprises a rotating drum 127 having conductors 124, 126, and 128 thereon to determine the time interval of emergency insertion of the control members 76 by the emergency insertion motor 116. The conductors are constructed of elongated portions of conducting material such, for example, as copper or a copper alloy. Each conductor is mounted on the circumference of the drum 127 by a suitable securing means, and each conductor is spaced laterally from adjacent conductors, respectively, so that no current can pass from one conductor to an adjacent one. The pairs of spaced contacts 131, 138 and 136 are located adjacent the circumference of the drum 127 in opposition to the respective conductors 124, 126 and 128 so that each pair of contacts can engage its conductor during specific portions of one revolution of the drum. When a pair of spaced contacts 131, 138 and 136 is in engagement with its conductor an electric circuit between that pair of contacts is completed. The rotating drum 127 is operable by the rotor of the motor 116 through the gear reduction box 134 and the clutch 122 when the latter is energized. The rotating drum 127 is also operable by the conventional A.C. motor 130 when the manually operable switch 132 is closed and the spaced contacts 136 are engaged by the drum conductor 128.

When relay coil 133 is deenergized and its switch 108 is closed, conductor 124 energizes and deenergizes the coil 121 of the clutch 122 at predetermined intervals during rotation of the drum 127. Conductor 126, which controls circuit 139 connected across switch 106, causes the commutator 82 to be operated by the motor 94 when it engages contacts 138. Conductor 128 completes the circuit 134 of the partial insertion limit switch reset motor 130 allowing the motor 130 to rotate the drum 127 when the switch 132 is closed.

The operation of the partial insertion limit switch assembly 125 can best be seen by describing how emergency control of the process is achieved. Normally the commutator 82 is being rotated by the programming motor 94 and when an emergency arises, relay circuit 110 is deenergized causing the switch 106 to open and switch 108 to close. Deenergization of the relay circuit 110 is performed either manually or by some external manual or automatic sensing control means which does not form a part of this invention. Of course, when the emergency no longer exists the relay circuit 110 will be reenergized. When the switch 108 is closed, the programming motor 94 may still be operating in either direction however, no rotation of the shaft 86 of the commutator 82 is taking place due to motor 94 because the clutch 91 is deenergized due to simultaneous opening of switch 106. The normal position of the drum 127 is as shown in FIG. 2 with switch 108 being closed, and the conductor 124 then being in engagement with the contacts 131 causes the clutch 122 to be engaged and the motor 116 to be energized. The shaft 86 of the commutator 82 is now rotated at a relatively rapid rate through the one-way clutch 112 by the motor 116 in a direction to shut-down the process. The drum 127 is also rotated by the motor 116 until the conductor 124 moves out of engagement with contacts 131 thereby deenergizing motor 116 causing the emergency insertion of the control members 76 to stop. At that time, the contacts 130 will be in engagement with the conductor 126, causing the coil 91 of the clutch 90 to be energized so that the commutator is then operable by the programming motor 94.

It is thereby noted that the time interval for emergency insertion is predetermined by the time that the conductor 124 engages contacts 131.

It has been found that substantially all emergency situations can be controlled by inserting the control members 76 a predetermined distance less than complete insertion, as indicated above, to thereby control such situations without the necessity of completely shutting down the process.

In the event that the relay circuit 110 is reenergized before the aforesaid predetermined time interval for emergency insertion is completed, the switch 106 is closed and the switch 108 is opened so that rotation of the commutator 82 by the emergency insertion motor 116 is halted and the commutator 82 is again operable by the programming motor 94.

To then reset the partial insertion limit switch assembly 125, the switch 132 is closed and the reset motor 130 rotates the drum 127 until the conductor 128 is moved out of engagement with contacts 136. The conductor 128 is located on the drum 127 so that the conductor 124 is then in engagement with the contacts 131 at the normal position illustrated in FIG. 2.

In the illustrative form of the invention, it is to be noted that only one of the commutator drive circuits is shown. However, each of the commutators D, E and F have identical drive circuits, and emergency control of the process will take place by all three commutators simultaneously, for the relay coils 133 are in common energizing circuit 110, as shown in FIG. 1. While emergency insertion of all control members 76 takes place simultaneously, normal operation of the control members 76 by commutators D, E and F can take place in any discrete manner by appropriate connection of the control motors to the output of any one of the three commutators D, E and F, as previously described.

Since numerous changes may be made in the above-described construction and different embodiments of this invention may be made without departing from the spirit and scope thereof, it is intended that all matter contained in the foregoing description or shown in the accompanying drawing shall be interpreted as illustrative and not in a limiting sense.

I claim as my invention:

1. A control means comprising, a source of direct current power, rotatable means for converting the direct current power to alternating current power at a plurality of frequencies dependent upon the speed of rotation thereof, a plurality of drive means for said converting means operating at different speeds, respectively, with one of said drive means being unidirectional, means for selectively connecting any one of said drive means to said converting means for operating the latter at different speeds to produce alternating currents of different frequencies, at least one movable control element, a frequency responsive means electrically connected to the output of said converting means for moving said control element for control of a process, whereby the rate of control of said process can be selected by appropriate selection of said drive means.

2. A control means comprising, a source of direct current power, rotatable means for converting the direct current power to alternating current power at a plurality of frequencies dependent upon the speed of rotation thereof, a plurality of drive means for said converting means operating the latter at different speeds, respectively, means for automatically disengaging one of said drive means operating said rotatable converting means at a slow speed when another drive means operating said rotatable converting means at a faster speed is engaged, at least one movable control element, a frequency responsive means electrically connected to the output of said converting means for moving said control element for control of a process, whereby the rate of control of said process can be selected by appropriate selection of said drive means.

3. A control means comprising, a source of direct current power, rotatable means for converting the direct current power to alternating current power at a plurality of frequencies dependent upon the speed of rotation thereof, a plurality of drive means for said converting means operating the latter at different speeds, respectively, means for automatically disengaging one of said drive means operating said rotatable converting means at a slow speed when another drive means operating said rotatable converting means at a faster speed is engaged, at least one movable control element, a frequency responsive means electrically connected to the output of said converting means for moving said control element for control of a process, whereby the rate of control of said process can be selected by appropriate selection of said drive means, and means for connecting one of said drive means operating said rotatable converting means at a faster speed to said rotatable converting means to operate the latter only in a direction to produce currents that operate said frequency responsive means in a direction for moving said control element to shut down said process.

4. A control means comprising, a source of direct current power, rotatable means for converting the direct current power to alternating current power at a plurality of frequencies dependent upon the speed of rotation thereof, a plurality of drive means for said converting means operating the latter at different speeds, respectively, means for automatically disengaging one of said drive means operating said rotatable converting means at a slow speed when another drive means operating said rotatable converting means at a faster speed is engaged, at least one movable control element, a frequency responsive means electrically connected to the output of said converting means for moving said control element for control of a process, whereby the rate of control of said process can be selected by appropriate selection of said drive means, and means for automatically deenergizing said drive means operating said rotatable converting means at a faster speed when said movable control element reaches a predetermined point in its travel.

5. A control means comprising, a source of direct current power, rotatable means for converting the direct current power to alternating current power at a plurality of frequencies dependent upon the speed of rotation thereof, a plurality of drive means for said converting means operating the latter at different speeds, respectively, means for automatically disengaging one of said drive means operating said rotatable converting means at a slow speed when another drive means operating said rotatable converting means at a faster speed is engaged, at least one movable control element, a frequency responsive means electrically connected to the output of said converting means for moving said control element for control of a process, whereby the rate of control of said process can be selected by appropriate selection of said drive means, means for connecting one of said drive means operating said rotatable converting means at a faster speed to said rotatable converting means to operate the latter only in a direction to produce currents that operate said frequency responsive means in a direction for moving said control element to shut down said process, and means for automatically deenergizing said drive means operating said rotatable converting means at a faster speed when said movable control element reaches a predetermined point in its travel.

6. A control means comprising, a source of direct current power, rotatable means for converting the direct current power to alternating current power at a plurality of frequencies dependent upon the speed of rotation thereof, a plurality of drive means for said converting means operating the latter at different speeds, respectively, means for automatically disengaging one of said drive means operating said rotatable converting means at a slow speed when another drive means operating said rotatable converting means at a faster speed is engaged, manually operable means for deenergizing at any time said drive means operating said rotatable converting means at a faster speed, at least one movable control element, a frequency responsive means electrically connected to the output of said converting means for moving said control element for control of a process, whereby the rate of control of said process can be selected by appropriate selection of said drive means.

7. A control means comprising, a source of direct current power, rotatable means for converting the direct current power to alternating current power at a plurality of frequencies dependent upon the speed of rotation thereof, a plurality of drive means for said converting means operating at different speeds, respectively, means for selectively connecting any one of said drive means to said converting means for operating the latter at different speeds to produce alternating currents of different frequency, at least one movable control element, a frequency responsive means electrically connected to the output of said converting means for moving said control element for control of a process, whereby the rate of control of said process can be selected by appropriate selection of said drive means, and means for connecting one of said drive means operating said rotatable converting means at a faster speed to said rotatable converting means to operate the latter only in a direction to produce currents that operate said frequency responsive means in a direction for moving said control element to shut down said process.

8. A control means comprising, a source of direct current power, a plurality of rotatable means for converting direct current power to alternating current power at a plurality of frequencies dependent upon the speed of rotation thereof, a plurality of drive means for each of said plurality of converting means operating at different speeds, means for selectively connecting any one of each plurality of drive means to its converting means for operating the latter at different speeds, respectively, to produce alternating currents of different frequency, a plurality of movable control elements, a plurality of frequency responsive means, each of said plurality of frequency responsive means connected to one of said plurality of movable control elements for moving each control element for control of a process, means for selectively connecting the inputs of said plurality of frequency responsive means to the outputs of said plurality of converting means, respectively, whereby the rate of control of said process is selected by appropriate selection of said drive means.

9. A control means comprising, a source of direct current power, a plurality of rotatable means for converting the direct current power to alternating current power at a plurality of frequencies dependent upon the speed of rotation thereof, a plurality of drive means for each of said plurality of converting means operating at different speeds, means for selectively connecting any one of each plurality of drive means to its converting means for operating the latter at different speeds, respectively, to produce alternating currents of different frequency, a plurality of movable control elements, a plurality of frequency responsive means, each of said plurality of frequency responsive means connected to one of said plurality of movable control elements for moving each control element for control of a process, means for selectively connecting the inputs of said plurality of frequency responsive means to the outputs of said plurality of converting means, and means for connecting one of said drive means operating said rotatable converting means at a faster speed to said rotatable converting means to operate the latter only in a direction to produce currents that operate said frequency responsive means in a direction for moving said control elements to shut down said process, whereby the rate of control of said process can be selected by appropriate selection of said drive means.

10. A control means comprising, a source of direct current power, a plurality of rotatable means for converting the direct current power to alternating current power at a plurality of frequencies dependent upon the speed of rotation thereof, a plurality of drive means for each of said plurality of converting means operating at different speeds, means for selectively connecting any one of each plurality of drive means to its converting means for operating the latter at different speeds, respectively, to produce alternating currents of different frequency, a plurality of movable control elements, a plurality of frequency responsive means, each of said plurality of frequency responsive means connected to one of said plurality of movable control elements for moving each control element for control of a process, means for selectively connecting the inputs of said plurality of frequency responsive means to the outputs of said plurality of converting means, whereby the rate of control of said process can be selected by appropriate selection of said drive means, means for arresting movement of said rotatable converting means for holding any of said movable control elements fixed in any position in its travel, means for disengaging drive means operating one of said plurality of rotatable converting means at a slow speed when another drive means operating said rotatable converting means at a faster speed is engaged, means for connecting the drive means operating one of said plurality of rotatable converting means at a faster speed to said one rotatable converting means to operate the latter only in a direction to produce currents that operate said plurality of frequency responsive means in a direction for moving said control elements operated by the last mentioned means to shut down said process, means for automatically disconnecting said drive means operating said rotatable converting means at a faster speed when said movable control elements reach a predetermined point in their travel, and manually operable means for deenergizing at any time said drive means operating said rotatable converting means at a faster speed.

11. A control means comprising, a source of direct current power, rotatable means for converting the direct current power to alternating current power at a plurality of frequencies dependent upon the speed of rotation thereof, a variable, reversible drive means for operating said converting means, a uni-directional, relatively high speed drive means for operating said converting means, means for automatically disengaging said variable drive means when said uni-directional drive means is engaged, at least one movable control element, a frequency responsive means electrically connected to the output of said converting means for moving said control element for control of a process, whereby the rate of control of said process can be selected by appropriate selection of said drive means.

12. A control means comprising, a source of direct current power, rotatable means for converting the direct current power to alternating current power at a plurality of frequencies dependent upon the speed of rotation thereof, a plurality of drive means for said converting means operating the latter at different speeds, respectively, means for automatically disengaging one of said drive means operating said rotatable converting means at a slow speed when another drive means operating said rotatable converting means at a faster speed is engaged, and at least one frequency responsive means having its input electrically connected to the output of said converting means.

13. A control means comprising, a source of direct current power, rotatable means for converting the direct current power to alternating current power at a plurality of frequencies dependent upon the speed of rotation thereof, a variable reversible drive means for operating said converting means, a unidirectional relatively high speed drive means for operating said converting means, means for automatically disengaging said variable drive means when said unidirectional drive means is engaged, and at least one frequency responsive means electrically connected to the output of said converting means.

14. A control means comprising, a source of direct current power, rotatable means for converting the direct current power to alternating current power at a plurality of frequencies dependent upon the speed of rotation thereof, a plurality of drive means for said converting means operating at different speeds, respectively, with one of said drive means being unidirectional, means for selectively connecting any one of said drive means to said converting means for operating the latter at different speeds to produce alternating currents at different frequencies, and at least one frequency responsive means electrically connected to the output of said converting means.

15. In a control means for moving a control member between two extreme positions, motive means for moving said control member in opposite directions between said extreme positions, power supply means for said motive means connected to energize said motive means to move said member at a relatively slow speed to a plurality of positions between said extreme positions, and said power supply means including circuit means connected to said motive means to energize the latter to move said member at a relatively faster speed toward one of said extreme positions.

16. In a control means for moving a control member between two extreme positions, motive means for moving said control member in opposite directions between said extreme positions, power supply means for said motive means connected to energize said motive means to move said member at a relatively slow speed to a plurality of positions between said extreme positions, said power supply means including circuit means connected to said motive means to energize the latter to move said member at a relatively faster speed toward one of said extreme positions, and means operated to disconnect said circuit means from said motive means when said control member has moved a predetermined distance toward said one extreme position.

17. In a control means for moving a plurality of control members between two extreme positions, motive means connected to each of said control members to move the latter independently in opposite directions between said extreme positions, power supply means connected to energize each of said motive means to move each of said members independently at a relatively slow speed to a plurality of positions between said extreme positions, and said power supply means including circuit means connected to all of said motive means to energize the latter to move all of said members at a relatively faster speed only toward one of said extreme positions.

18. In a control means for moving a plurality of control members between two extreme positions, motive means connected to each of said control members to move the latter independently in opposite directions between said extreme positions, power supply means connected to energize each of said motive means to move each of said members independently at a relatively slow speed to a plurality of positions between said extreme positions, said power supply means including circuit means connected to all of said motive means to energize the latter to move all of said members at a relatively faster speed only toward one of said extreme positions, and means automatically operated to disconnect said circuit means from said motive means when said control members have moved a predetermined distance toward said one extreme position.

19. In a control means for moving a control member between two extreme positions, the combination comprising frequency responsive motive means for moving said control element in opposite directions between said extreme positions, power supply means connected to said motive means to supply relatively low frequency power to said motive means to move said member at a relatively low speed, said power supply means including means for supplying relatively higher frequency power to said motive means to move said member at a relatively faster speed toward only one of said extreme positions, and means responsive to predetermined movement of said member at said relatively faster speed to interrupt the supply of said relatively higher frequency power to said motive means.

(References on following page)

References Cited by the Examiner

UNITED STATES PATENTS

| | | | |
|---|---|---|---|
| 1,810,227 | 6/31 | Shea | 318—231 X |
| 2,356,590 | 8/44 | Jacobsen | 318—67 X |
| 2,629,075 | 2/53 | Deschmann | 318—158 X |
| 2,748,297 | 5/56 | Johnson et al. | 318—231 X |
| 2,961,589 | 11/60 | Ghalib et al. | 318—171 |

FOREIGN PATENTS

| | | |
|---|---|---|
| 1,218,123 | 2/58 | France. |
| 847,941 | 2/57 | Great Britain. |
| 500,163 | 2/52 | Italy. |

ORIS L. RADER, *Primary Examiner*.